United States Patent [19]

Steckler

[11] Patent Number: 4,995,152

[45] Date of Patent: Feb. 26, 1991

[54] CHALKING LINE RETAINER

[76] Inventor: Edward T. Steckler, 124 Hershey Mill Rd., Apt. #A-1, Mountville, Pa. 17554

[21] Appl. No.: 456,535

[22] Filed: Dec. 26, 1989

[51] Int. Cl.⁵ .................. F16G 11/00; B43L 13/00
[52] U.S. Cl. .................... 24/129 R; 24/129 B; 33/409
[58] Field of Search ............ 24/129 R, 129 A, 129 B; 33/408, 409, 410, 413

[56] References Cited

U.S. PATENT DOCUMENTS

| 322,501 | 7/1885 | Taylor | 24/129 R |
|---|---|---|---|
| 458,464 | 8/1891 | Kelley | 33/410 |
| 765,250 | 7/1904 | McPherson | 33/409 |
| 1,135,736 | 4/1915 | Steuler | 24/129 B |
| 1,480,006 | 1/1924 | Ortman | 24/129 R |
| 2,663,938 | 12/1953 | Stodgell | 33/413 |
| 4,561,189 | 12/1985 | Hirneise | 33/408 |
| 4,785,509 | 11/1988 | Fisher | 24/129 R |

Primary Examiner—Victor N. Sakran
Attorney, Agent, or Firm—Buchanan Ingersoll

[57] ABSTRACT

A chalking string retainer for holding one end of a chalking string at the edge or corner of a surface to be marked with the string. The retainer comprises a plate with a bracket shaped in the form of a V depending from the plate. There is a first hole near the apex of the V through which the string passes and at which the string is knotted and there is a second hole on said plate through which the string also passes for pulling.

8 Claims, 1 Drawing Sheet

CHALKING LINE RETAINER

BACKGROUND OF THE INVENTION

This invention relates to a device for applying a chalk line to a surface during construction or carpentry work.

SUMMARY OF THE INVENTION

This invention relates to a chalking string holding or retaining device for striking a chalk line on a working surface. The device can be mounted and used by a single operator without assistance.

The retaining device can be mounted on a straight edge of a working surface or with equal facility it can be mounted on a corner of the working surface on which the mark is to be applied.

The retaining device has a V-shaped bracket or brace member which provides rigidity to the device and protection against bending when the attached string is pulled taut during use.

The retaining device is provided with multiple surfaces or edges for fixing the device in a single position during use. These features and advantages of the device will become apparent from the following description of the device which refers to the accompanying drawings.

DESCRIPTION OF THE PREFERRED EMBODIMENT

Figure 1:
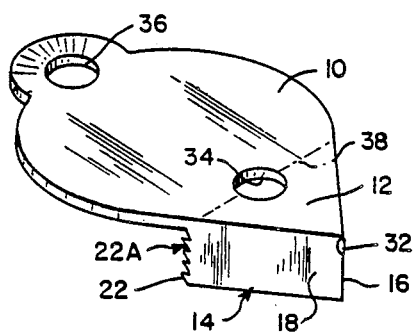
FIG. 1 is an isometric top view of a chalking string retainer of the invention.
Figure 2:
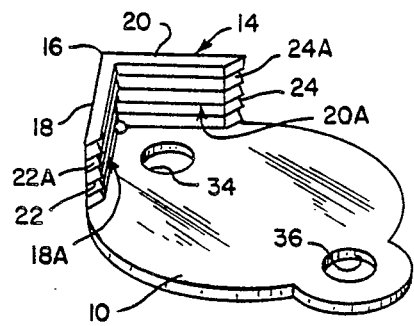
FIG. 2 is an isometric bottom view of the retainer.
Figure 3:
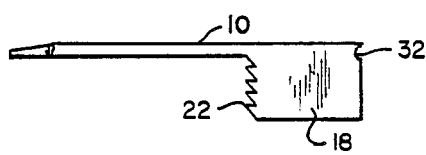
FIG. 3 is a side view of the retainer.
Figure 4:
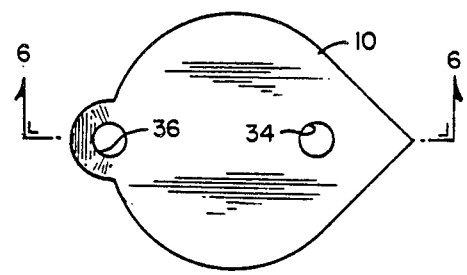
FIG. 4 is a top plan view of the retainer.
Figure 6:
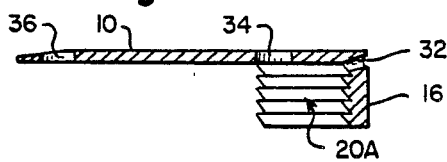
FIG. 6 is a cross-sectional view through the section 6—6 of FIG. 4.
Figure 5:
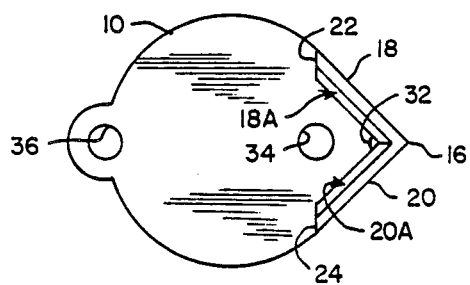
FIG. 5 is a bottom plan view of the retainer.

FIG. 1 shows a retainer or anchor having a top plate 10 having a front end 12 shaped in the form of a V to conform with the shape of V-shaped bracket 14 which depends from plate 10 at end 12. As shown in FIGS. 1 and 2, bracket 14 comprises apex 16 and a pair of legs 18 and 20 terminating with toes 22 and 24, respectively. Legs 18 and 20 can be of equal length. As shown in FIGS. 1 and 2, legs 18 and 20 form an enclosed angle and extend longitudinally adjacent a surface of plate 10. The interior surface of leg 18 is serrated as indicated at 18A and the interior surface of leg 20 is serrated as indicated at 20A. In addition, the surface of the toe 22 is serrated as indicated at 22A and the surface of toe 24 is serrated as indicated at 24A. These features are also shown in FIGS. 3, 4, 5 and 6.

Figure 7:
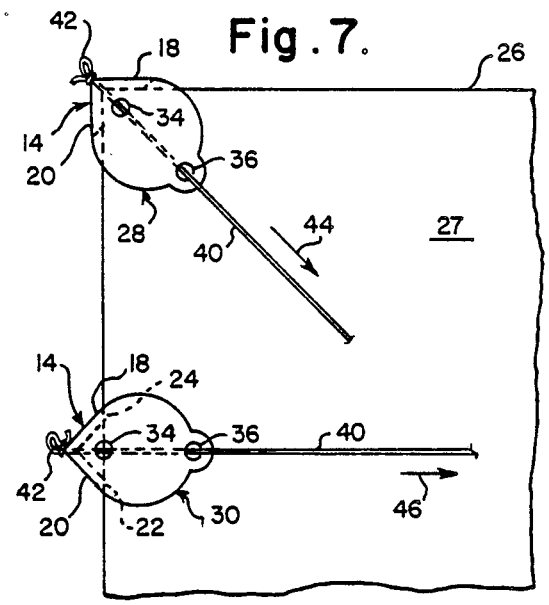
FIG. 7 shows the retainer in place both at the corner and at the side of a surface to be marked.

FIG. 7 shows the retainer of the invention in two different mountings on board 26 having a surface 27 to be marked with chalk. Board 26 can be plyboard, plasterboard, or other material such as sheet metal, concrete, glass or any board or other material on which it is desired to apply a straight chalk line by snapping a string. FIG. 7 shows that V-shaped bracket 14 has the versatility to serve as either a corner anchor or a side anchor. When the angle formed by legs 18 and 20 is substantially 90 degrees, bracket 14 is suited to serve as a corner anchor, as shown at 28, with the interior surfaces of legs 18 and 20 abutting different sides of board 26. When legs 18 and 20 are of equal length, the retainer is also suited to serve as a side anchor as shown at 30, with the toes 22 and 24 abutting the same side of board 26. In this case the angle formed by the V can be less than 90 degrees. Serrated surfaces 18A and 20A function as friction enhancing surfaces when the retainer is used as a corner anchor while serrated edges or toes 22A and 24A serve as friction enhancing surfaces when the retainer is used as an anchor at a straight edge.

The retainer is provided with three holes, including a hole 32 in the vicinity of or on apex 16 of V bracket 14, an intermediate hole 34 on an imaginary line 38 connecting the toes of the V bracket, as shown in FIGS. 1, and hole 36, which is remote from apex hole 32. The centers of holes 32, 34 and 36 are aligned with each other, with the alignment being on the bisect of the angle formed by the V. Hole 34 can be used as a sight to position the retainer on a mark on the edge of surface 27 when the retainer is used in the position 30. Holes 32 and 36 are used for threading chalked pulley string 40 through the retainer. One end of string 40 is passed through apex hole 32 and knotted on the outside of hole 32 with knot 42, as shown in FIG. 7. The unknotted end of string 40 passes underneath hole 34 and plate 10 and then upwardly through hole 36, where it is available for pulling the direction shown by arrows 44 and 46.

Pulling of string 40 in the directions shown by the arrows in FIG. 7 urges the retainer against board 26, allowing string 40 to become taut without any person holding the retainer. Then one person positioned remotely from the retainer can snap string 40 to impart a straight chalk line on surface 27.

The device can be made of a ferrous metal but a non-ferrous material, such as brass, is preferred to avoid rusting. Plastic can also be used.

I claim:

1. A chalking string retainer for holding one end of a chalking string at the edge or corner of a surface to be marked with said string, said retainer comprising a plate, a bracket shaped in the form of a V depending from said plate, said V bracket having a pair of elongated legs forming an enclosed angle, said legs extending longitudinally adjacent a surface of said plate, a first hole on said retainer near the apex of the V through which the string passes and at which the string is knotted and a second hole on said plate through which the string also passes for pulling.

2. The chalking string retainer of claim 1 including a third hole on said plate, said third hole located substantially at the midpoint of an inmaginary line connecting the toes of the V, said third hole providing a sight for positioning said retainer on the surface to be marked.

3. The chalking string retainer of claim 2 wherein said first, second and third holes are aligned so that said string passes through said first and third holes and under said second hole.

4. The chalking string retainer of claim 1 wherein the inside surfaces of the legs of the V are serrated for frictional engagement of said bracket about a corner of the surface to be marked upon pulling said string.

5. The chalking string retainer of claim 1 wherein the legs of the V have terminal ends and said ends are serrated for frictional engagement of said bracket to a side edge of the surface to be marked upon pulling said string.

6. The chalking string retainer of claim 1 wherein the angle formed by the V is substantially 90 degrees.

7. The chalking string retainer of claim 1 wherein the angle formed by the V is less than 90 degrees.

8. The chalking string retainer of claim 1 wherein the end of said plate from which said bracket depends is V-shaped to conform with the shape of said bracket.

* * * * *